United States Patent
Holness et al.

(10) Patent No.: US 11,658,900 B2
(45) Date of Patent: May 23, 2023

(54) RESPONDING TO OPERATOR COMMANDS IN A MULTI-HOMING ETHERNET VIRTUAL PRIVATE NETWORK (EVPN)

(71) Applicant: Ciena Corporation, Hanover, MD (US)

(72) Inventors: Marc Holness, Nepean (CA); Peng He, East Brunswick, NJ (US); Himanshu Shah, Hopkinton, MA (US); Selvamani Ramasamy, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/349,344

(22) Filed: Jun. 16, 2021

(65) Prior Publication Data

US 2022/0407798 A1   Dec. 22, 2022

(51) Int. Cl.
*H04L 45/24* (2022.01)
*H04L 12/46* (2006.01)
*H04L 45/00* (2022.01)

(52) U.S. Cl.
CPC .......... *H04L 45/24* (2013.01); *H04L 12/4641* (2013.01); *H04L 45/22* (2013.01)

(58) Field of Classification Search
CPC ...... H04L 45/24; H04L 12/4641; H04L 45/22
See application file for complete search history.

(56) References Cited

U.S. PATENT DOCUMENTS

| | | | |
|---|---|---|---|
| 6,330,614 B1 | 12/2001 | Aggarwal et al. | |
| 7,386,605 B2 | 6/2008 | Shah et al. | |
| 7,430,176 B2 | 9/2008 | Nalawade et al. | |
| 7,506,194 B2 | 3/2009 | Appanna et al. | |
| 7,532,631 B2 | 5/2009 | Raszuk et al. | |
| 7,590,054 B1 | 9/2009 | Holness et al. | |
| 7,792,044 B2 | 9/2010 | Holness et al. | |
| 8,018,841 B2 | 9/2011 | Holness et al. | |
| 8,259,590 B2 | 9/2012 | Shah et al. | |
| 8,295,175 B2 | 10/2012 | Ellis et al. | |
| 8,295,278 B2 | 10/2012 | Shah et al. | |
| 8,305,938 B2 | 11/2012 | Holness et al. | |
| 8,345,603 B2 | 1/2013 | Nelakonda et al. | |
| 8,509,061 B2 | 8/2013 | Holness et al. | |
| 8,560,708 B2 | 10/2013 | Nelakonda et al. | |
| 8,588,060 B2 | 11/2013 | Holness | |

(Continued)

FOREIGN PATENT DOCUMENTS

EP   3097659 B1   3/2021

*Primary Examiner* — Kibrom T Hailu
(74) *Attorney, Agent, or Firm* — Baratta Law PLLC; Lawrence A. Baratta, Jr.

(57) ABSTRACT

Systems and methods for extending Ethernet Virtual Private Network (EVPN) protocols are provided. A Link Aggregation Group (LAG), according to one implementation, includes a plurality of Ethernet Segments (ESs) and a plurality of service ports configured to communicate over the plurality of ESs. The service ports are configured to enable an operator device to access an EVPN to receive Layer 2 (L2) and Layer 3 (L3) Ethernet services. Also, the service ports are configured to enable the operator device to operate with multi-homing functionality to receive the L2 and L3 Ethernet services via redundant paths associated with the plurality of ESs. The services ports are further configured to respond to operator commands, whereby the operator commands include one or more operator commands related to switching among the redundant paths.

18 Claims, 9 Drawing Sheets

(56) References Cited

U.S. PATENT DOCUMENTS

| | | | |
|---|---|---|---|
| 8,737,198 B1 | 5/2014 | Holness et al. | |
| 8,787,147 B2 | 7/2014 | Caird et al. | |
| 8,953,456 B2 | 2/2015 | Mohan et al. | |
| 9,019,814 B1 * | 4/2015 | Mohanty | H04L 41/08 370/219 |
| 9,025,435 B2 | 5/2015 | Holness et al. | |
| 9,036,641 B2 | 5/2015 | Allan et al. | |
| 9,075,717 B2 | 7/2015 | Mohan, Jr. et al. | |
| 9,106,573 B2 | 8/2015 | Martin et al. | |
| 9,160,563 B2 | 10/2015 | Ryoo et al. | |
| 9,197,493 B2 | 11/2015 | Holness et al. | |
| 9,203,549 B2 | 12/2015 | Holness et al. | |
| 9,319,268 B2 | 4/2016 | Allan et al. | |
| 9,401,817 B2 | 7/2016 | Holness et al. | |
| 9,781,048 B2 | 10/2017 | Holness et al. | |
| 9,860,169 B1 * | 1/2018 | Ninan | H04L 12/56 |
| 9,893,937 B2 | 2/2018 | Holness et al. | |
| 9,960,993 B2 | 5/2018 | Hu et al. | |
| 10,122,619 B2 | 11/2018 | Holness et al. | |
| 10,142,254 B1 | 11/2018 | Olofsson et al. | |
| 10,277,493 B2 | 4/2019 | Holness | |
| 10,277,558 B2 | 4/2019 | Khan et al. | |
| 10,425,153 B2 | 9/2019 | Holness et al. | |
| 10,623,293 B2 | 4/2020 | Hu et al. | |
| 10,652,024 B2 | 5/2020 | Holness | |
| 10,721,139 B2 | 7/2020 | Holness et al. | |
| 10,785,100 B2 | 9/2020 | Holness | |
| 10,819,646 B2 | 10/2020 | Srivastava et al. | |
| 10,826,813 B2 | 11/2020 | Holness | |
| 2005/0068950 A1 | 3/2005 | Ellis et al. | |
| 2005/0071453 A1 | 3/2005 | Ellis et al. | |
| 2005/0099949 A1 | 5/2005 | Mohan et al. | |
| 2005/0099951 A1 | 5/2005 | Mohan et al. | |
| 2005/0099954 A1 | 5/2005 | Mohan et al. | |
| 2005/0099955 A1 | 5/2005 | Mohan et al. | |
| 2007/0064700 A1 | 3/2007 | Holness | |
| 2007/0268817 A1 | 11/2007 | Smallegange et al. | |
| 2008/0123656 A1 * | 5/2008 | Chen | H04L 45/60 370/412 |
| 2010/0135291 A1 | 6/2010 | Martin et al. | |
| 2015/0003295 A1 | 1/2015 | Bottorff et al. | |
| 2015/0124837 A1 * | 5/2015 | Saltsidis | H04L 41/0893 370/419 |
| 2016/0191324 A1 | 6/2016 | Olofsson et al. | |
| 2017/0339028 A1 * | 11/2017 | Holness | H04L 49/555 |
| 2018/0331946 A1 | 11/2018 | Olofsson et al. | |
| 2020/0028761 A1 | 1/2020 | Holness | |
| 2020/0036570 A1 | 1/2020 | Curtis et al. | |
| 2020/0036686 A1 | 1/2020 | Olofsson et al. | |
| 2020/0112495 A1 | 4/2020 | Attarwala et al. | |
| 2020/0213155 A1 * | 7/2020 | Bickhart | H04L 63/0272 |
| 2020/0220811 A1 | 7/2020 | Shah | |
| 2020/0358681 A1 | 11/2020 | Shah et al. | |
| 2020/0374215 A1 | 11/2020 | Shah et al. | |
| 2021/0021511 A1 | 1/2021 | James et al. | |
| 2021/0036910 A1 | 2/2021 | Holness | |
| 2022/0045986 A1 * | 2/2022 | Lo | H04L 45/02 |
| 2022/0321451 A1 * | 10/2022 | Brissette | H04L 12/46 |

* cited by examiner

| Code | Command or Mode |
|---|---|
| 1111 | Lockout of Protection (LO) |
| 1110 | Signal Failure (standby connection) |
| 1101 | Forced Switch (FS) |
| 1011 | Signal Failure (active connection) |
| 1001 | Signal Degrade |
| 0111 | Manual Switch (MS) |
| ⋮ | |
| 0001 | Do Not Revert |
| 0000 | No request (Clear) |

| 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Type = 0x06 |||||||| Sub-Type 0x06 |||||||| RSV ||| DF Alg. ||||| Bitmap... |||||||
| ... Bitmap |||||||||||| Code |||| Reserved ||||||||||||||||

| INPUT | | | OUTPUT | |
|---|---|---|---|---|
| Node State | Top Priority Request | Row | Actions | Next State |
| A (Idle) | Clear | 1 | No action | A |
| | Force Switch | 2 | Tx LACP (out-of-sync=1) on member I/F(s)<br>Tx ES-Route (FS) to peer(s)<br>Withdraw ES-Route<br>Run DF election | D |
| | ES-Route (FS) | 3 | Tx LACP (out-of-sync=0) on member I/F(s)<br>Run DF election | D |
| | Local SF | 4 | Tx LACP (out-of-sync=1) on member I/F(s)<br>Tx ES-Route (SF) to peer(s)<br>Run DF election | B |
| | Local SF Clear | 5 | No action | A |
| | ES-Route (SF) | 6 | Tx LACP (out-of-sync=0) on member I/F(s)<br>Run DF election | B |
| | ES-Route (MS) | 7 | Tx LACP (out-of-sync=0) on member I/F(s)<br>Run DF election | C |
| | Manual Switch | 8 | Tx LACP (out-of-sync=1) on member I/F(s)<br>Tx ES-Route (MS) to peer(s)<br>Withdraw ES-Route<br>Run DF election | C |
| | Manual Revert | 9 | Run DF election (with "admin" values) | A |
| | ES-Route (Clear) | 10 | No action | A |

FIG. 8

| | INPUT | | OUTPUT | |
|---|---|---|---|---|
| Node State | Top Priority Request | Row | Actions | Next State |
| B (Protect) | Clear | 11 | No action | B |
| | Force Switch | 12 | Tx LACP (out-of-sync=1) on member I/F(s)<br>Tx ES-Route (FS) to peer(s)<br>Withdraw ES-Route<br>Run DF election | D |
| | ES-Route (FS) | 13 | Tx LACP (out-of-sync=0) on member I/F(s)<br>Run DF election | D |
| | Local SF | 14 | Tx LACP (out-of-sync=1) on member I/F(s)<br>Tx ES-Route (SF) to peer(s)<br>Run DF election | B |
| | Local SF Clear | 15 | Tx ES-Route (Clear) to peer(s)<br>If Revertive:<br>    Run DF election | A |
| | ES-Route (SF) | 16 | No action | B |
| | ES-Route (MS) | 17 | No action | B |
| | Manual Switch | 18 | No action | B |
| | ES-Route (Clear) | 19 | Tx ES-Route (Clear) to peer(s)<br>If Revertive:<br>    Run DF election | A |

FIG. 9

| INPUT | | | OUTPUT | |
|---|---|---|---|---|
| Node State | Top Priority Request | Row | Actions | Next State |
| C (Manual Switch) | Clear | 20 | Tx ES-Route (Clear) to peer(s)<br>Tx LACP (out-of-sync=0) on member I/F(s)<br>Run DF election | A |
| | Force Switch | 21 | Tx LACP (out-of-sync=1) on member I/F(s)<br>Tx ES-Route (FS) to peer(s)<br>Withdraw ES-Route<br>Run DF election | D |
| | ES-Route (FS) | 22 | Tx LACP (out-of-sync=0) on member I/F(s)<br>Run DF election | D |
| | Local SF | 23 | Tx LACP (out-of-sync=1) on member I/F(s)<br>Tx ES-Route (SF) to peer(s)<br>Run DF election | B |
| | Local SF Clear | 24 | No action | C |
| | ES-Route (SF) | 25 | Tx LACP (out-of-sync=0) on member I/F(s)<br>Run DF election | B |
| | ES-Route (MS) | 26 | No action | C |
| | Manual Switch | 27 | No action | C |
| | ES-Route (Clear) | 28 | Tx ES-Route (Clear) to peer(s)<br>Run DF election | A |

FIG. 10

| INPUT | | | OUTPUT | |
|---|---|---|---|---|
| Node State | Top Priority Request | Row | Actions | Next State |
| D (Forced Switch) | Clear | 29 | Tx ES-Route (Clear) to peer(s)<br>Tx LACP (out-of-sync=0) on member I/F(s)<br>Run DF election | A |
| | Force Switch | 30 | Tx LACP (out-of-sync=1) on member I/F(s)<br>Tx ES-Route (FS) to peer(s)<br>Withdraw ES-Route<br>Run DF election | D |
| | ES-Route (FS) | 31 | No action | D |
| | Local SF | 32 | No action | D |
| | Local SF Clear | 33 | No action | D |
| | ES-Route (SF) | 34 | No action | D |
| | ES-Route (MS) | 35 | No action | D |
| | Manual Switch | 36 | No action | D |
| | ES-Route (Clear) | 37 | Tx ES-Route (Clear) to peer(s)<br>Run DF election | A |

FIG. 11

RESPONDING TO OPERATOR COMMANDS IN A MULTI-HOMING ETHERNET VIRTUAL PRIVATE NETWORK (EVPN)

FIELD OF THE DISCLOSURE

The present disclosure generally relates to protocols related to Ethernet Virtual Private Networks (EVPNs). More particularly, the present disclosure relates to systems and methods for extending EVPN protocols to enable responses to operator commands (e.g., Force Switch, Manual Switch, Clear, etc.) associated with protection (or redundancy) switching.

BACKGROUND OF THE DISCLOSURE

Ethernet Virtual Private Network (EVPN) technology is an emerging technology that introduces a new model for delivery of Ethernet services. In particular, EVPN is configured for carrying both Layer 2 (L2) and Layer 3 (L3) Ethernet traffic over the same infrastructure in a Wide Area Network (WAN) setting. EVPN technology is replacing the legacy Pseudo Wire (PW) technology for L2 Virtual Private Local Area Network (LAN) Service (VPLS) and Virtual Private Wire Service (VPWS). The specifications and protocols of EVPN are described, for example, in RFC 7209, "Requirements for Ethernet VPN (EVPN)," May 2014, RFC 7432, "BGP MPLS-Based Ethernet VPN," February 2015, and RFC 8365, "A Network Virtualization Overlay Solution Using Ethernet VPN (EVPN)," March 2018, the contents of each are incorporated by reference.

EVPN uses Border Gateway Protocol (BGP) signaling to establish the EVPN instance (EVI) with BGP peers to offer a multipoint-to-multipoint L2 Ethernet service for a given client. EVPN relies on learning the Internet Protocol (IP) and Media Access Control (MAC) address binding of the locally connected Customer Edge (CE) devices and distributing this information in the BGP EVPN Protocol Data Units (PDUs) to remote Provider Edge (PE) devices that are members of the established EVPN instance. That is, conventionally, EVPN utilizes BGP for control plane-based learning. In particular, BGP utilizes an EVPN Network Layer Reachability Information (NLRI), which includes a Route Type field that details the encoding of the EVPN NLRI. The Route Types include 1—Ethernet Auto-Discovery (A-D) route, 2—MAC/IP Advertisement route, 3—Inclusive Multicast Ethernet Tag route, and 4—Ethernet Segment route.

Also, EVPN systems provide multi-homing functionality allowing a computer network (e.g., a Customer Edge (CE) device, an end-user device, a host, etc.) to be connected to more than one network via a plurality of Ethernet Segments (ESs). Thus, with multi-homing, multiple redundant connections or paths can be available for increasing the reliability and performance of Ethernet services to the CE device. For example, if one path fails or degrades, data packets can be transmitted through one or more backup or protection paths. In some cases, multiple simultaneous connections can be used through a system for more efficient routing. Thus, multi-homing can allow for single-active or all-active access to an EVPN system.

In EVPNs, a Designated Forwarder (DF) is defined as a device (e.g., a Provider Edge (PE) device) responsible for sending Broadcast, Unknown unicast, and Multicast (BUM) traffic to a multi-homed device. A preferred DF is selected from a number of PEs for operation as an active connection, while one or more backup DFs may be selected for operation as backup connections. Service Providers allow a way to force a DF switchover in order to carry out some maintenance tasks on the preferred DF and control how backup DFs may be utilized.

The Internet Engineering Task Force (IETF) also publishes specifications and protocols regarding ongoing research with respect to EVPN technology. In one publication entitled "Preference-based EVPN DF Election" (draft-ietf-bess-evpn-pref-df), it is recognized that "Service Providers require an easy way to force an on-demand DF switchover in order to carry out some maintenance tasks on the existing DF or control whether a new active PE can preempt the existing DF PE . . . " This can be accomplished by changing the preference value when a maintenance task is to be conducted. As also stated in this draft, "Once the maintenance on PE3 is over, the operator could decide to leave the existing preference or configure the old preference back . . . "

However, it has been noted that the current EVPN specifications do not support the handling of operator commands with respect to protection switching, which Service Providers demand. Conventional solutions in EVPN multi-homing applications do not provide well established protection-based operator commands (e.g., Force Switch, Manual Switch, Clear, Manual Revert, etc.) in an operationally-friendly manner. Instead, conventional specifications include convoluted procedures requiring a network operator to change configuration settings (e.g., Designated Forwarder (DF) preference values) back and forth, which is not only error prone, but also operationally unfriendly. Therefore, there is a need in the field of EVPN multi-homing environments to handle operator commands related to protection (backup) switching to redundant paths.

BRIEF SUMMARY OF THE DISCLOSURE

The present disclosure is directed to systems and methods for extending the conventional specifications and protocols related to Ethernet Virtual Private Network (EVPN) systems. In particular, the extensions to EVPN described herein are related to the ability of EVPN multi-homing groups to handle/support Operator Commands (e.g., Force Switch, Manual Switch, Clear, etc.).

According to one implementation, a system includes a plurality of Ethernet Segments (ESs) and a plurality of service ports configured to communicate over the plurality of ESs. The plurality of service ports is configured to enable an operator device to access an Ethernet Virtual Private Network (EVPN) to receive Layer 2 (L2) and Layer 3 (L3) Ethernet services. The service ports are configured to enable the operator device to operate with multi-homing functionality to receive the L2 and L3 Ethernet services via redundant paths associated with the plurality of ESs. Also, the services ports are configured to respond to operator commands, the operator commands including one or more operator commands related to switching among the redundant paths.

The one or more operator commands used in this system may be part of an extension of EVPN protocols. The extension of the EVPN protocols enables signaling between the operator device and the service ports to carry ES route messages that include the operator commands. The EVPN protocol extension includes an Extended Community field configured to carry the operator commands. Also, the Extended Community field may include a Designated Forwarder (DF) election sub-type for electing an active ES and one or more backup ESs as redundant paths responsive to the one or more operator commands.

The service ports are associated with one or more Provider Edge (PE) devices of a Link Aggregation Group (LAG), whereby the operator device may be a Customer Edge (CE) device and the ESs may include a set of Ethernet links connecting the CE device to the one or more PE devices. The LAG enables single-active or all-active forwarding with respect to the one or more PE devices, load balancing among the one or more PE devices, and Media Access Control (MAC) and Internet Protocol (IP) traffic learning by the one or more PE devices.

The one or more operator commands may include a Lockout command, a Force Switch command, a Manual Switch command, a Revert Mode Selection command, and a Manual Revert command. In this system, there may be a particular priority of operator commands and detected operating modes that includes, in order from highest priority to lowest, the Lockout command, a Signal Failure (SF) mode of a backup ES path, the Force Switch command, a SF mode of an active ES path, a Signal Degrade mode of the active ES path, the Manual Switch command, a Wait to Restore command, an Exercise command, the Manual Revert command, the Mode Selection command, and a Clear command. The ESs and service ports may be associated with a Finite-State Machine (FSM) having an Idle state, a Protection state, a Manual Switch state, and a Forced Switch state. The ESs and service ports may be configured to change states and perform actions based on the operator commands.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 8-11 are tables illustrating actions and states respectively associated with an Idle state, a Protection state, a Manual Switch state, and a Forced Switch state of the FSM shown in FIG. 7, according to various embodiments.

DETAILED DESCRIPTION OF THE DISCLOSURE

In various embodiments, the present disclosure relates to systems and methods for extending Ethernet Virtual Private Network (EVPN) specifications and protocols. In particular, the present systems and methods are configured to provide an extension of EVPN specifications by allowing the management of operator commands related to protection switching functionality. For example, protection switching is related to allowing multiple connection paths to provide redundancy for a Customer Edge (CE) device, end-user device, host, etc. In this way, the CE device can access multiple ports of one or more Provider Edge (PE) devices to receive Ethernet services from an EVPN. In the context of an EVPN system, a PE may be configured as a router between one Service Provider's area and those areas administered by other Service Providers (e.g., Internet Service Provider). A CE may also be a router at a customer premises and may be connected to the PE of the Service Provider's Internet Protocol (IP) or Multi-Protocol Label Switching (MPLS) network.

EVPN is a relatively new technology that introduces a new model for delivery of Ethernet services. Specifically, EVPN allows the delivery of Layer 2 (L2) and Layer 3 (L3) Ethernet services over the same infrastructure, provides multi-homing with all-active forwarding, load balancing between PEs, and/or active/standby forwarding between PEs, and provides greater control of Media Access Control (MAC) and Internet Protocol (IP) traffic learning. For example, Request for Comments 7432 (RFC 7432) defines multi-homing (e.g., single-active or all-active) access to an EVPN system.

Figure 1:
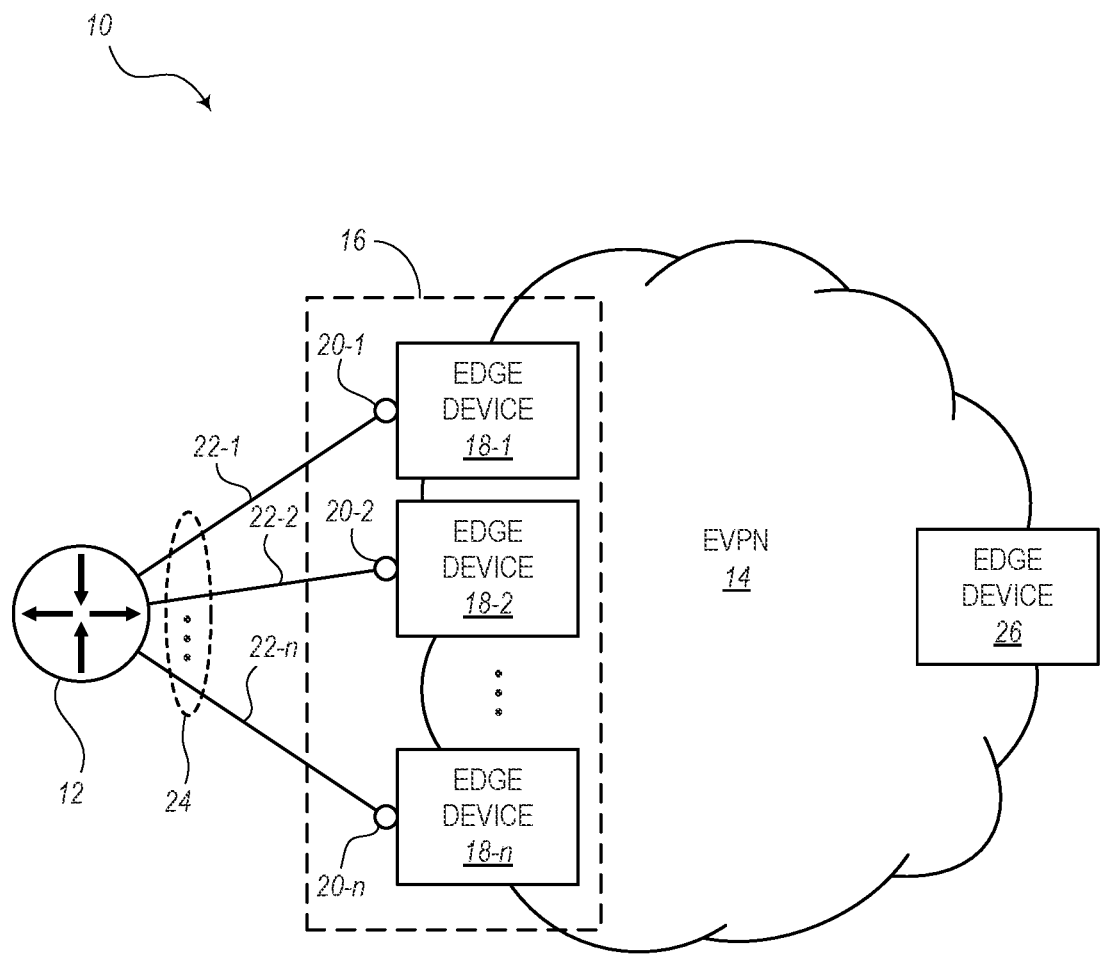
FIG. 1 is a schematic diagram illustrating an Ethernet Virtual Private Network (EVPN) system, according to various embodiments of the present disclosure.

FIG. 1 is a schematic diagram illustrating an embodiment of an EVPN system 10. In this embodiment, the EVPN system 10 includes an operator device 12 (e.g., a Customer Edge (CE) device, end-user device, host, etc.) configured to receive Ethernet services from an EVPN 14. The EVPN system 10 also includes an EVPN Link Aggregation Group (EVPN-LAG) 16 configured at an edge of the EVPN 14. In some embodiments, the EVPN-LAG 16 may include one or more edge devices 18-1, 18-2, . . . , 18-$n$ (e.g., one or more Service Provider devices, Provider Edge (PE) devices, etc.). Each edge device 18 may include one or more ports 20-1, 20-2, . . . , 20-$n$. It should be noted that the one or more of edge devices 18 may include multiple ports 20 in this EVPN-LAG. The operator device 12 is connected to the ports 20-1, 20-2, . . . , 20-$n$ via a plurality of links 22-1, 22-2, . . . , 22-$n$ forming a Link Aggregation (LAG) 24, which may be defined by IEEE 802.1AX and which may be run with or without Link Aggregation Control Protocol (LACP). In addition, the EVPN system 10 may include another edge device 26 (e.g., Service Provider device, PE device, etc.) connected to the edge devices 18 of the EVPN-LAG 16 via the EVPN 14.

According to various implementations, the EVPN system 10 may be configured to operate using conventional EVPN specifications and protocols. However, in addition to these conventional specifications, the EVPN system 10 may further include an extension to the specifications to allow for additional functionality. Particularly, the EVPN extension described herein allows the management of switching operations with respect to switching from an active (e.g., working, primary) path to one or more backup (e.g., protection, standby) path in a protection or redundancy system. In this EVPN-LAG, only one-link is active, or one PE is active, or multiple links/PEs are active.

The present disclosure focuses on at least the following Internet Engineering Task Force (IETF) RFCs (and/or drafts of modifications to the RFCs). For example, one draft is described in draft-ietf-bess-evpn-mh-pa ("EVPN multi-homing port-active (Active/Standby) load-balancing"). A specification regarding the Designated Forwarder (DF) is described in RFC 8584 ("Framework for Ethernet VPN Designated Forwarder Election Extensibility"). Another draft is described in draft-ietf-bess-pref-df ("Preference-based EVPN DF Election"). Since protection switching functionality is not described in these specifications, the present disclosure is configured to provide an extension to allow for protection switching in an EVPN multi-homing environment. For example, operator commands for EVPN multi-homing applications do not include protection switching mechanisms in conventional system. Thus, the present disclosure provides support for many of the traditional operator commands in this regard, which may be offered by other types of mature protection switching techniques and may be demanded by network operators.

Some of the common operator commands related to protection switching include:
1) Lockout (or Lockout of Protection)—Denies traffic signal access to a protection section, connection, or path, unless an equal protection switch command is in effect;
2) Forced Switch—Switches traffic to another section, connection, or path (e.g., a protection, standby, or backup connection), unless an equal or higher priority switch command is in effect or a Signal Failure (SF) condition exists on the protection section;
3) Manual Switch—Switches traffic to another section, connection, or path (e.g., the protection, standby, or backup connection), unless a failure condition exists on other connections or an equal or higher priority switch command is in effect; and
4) Clear—Clears all the externally initiated switch commands.

Operator commands may be standard commands for protection switching technologies, including, for example, at least:
a) ITU-T G.8031/Y.1342—Ethernet Linear Protection Switching;
b) ITU-T G.8032/Y.1344—Ethernet Ring Protection Switching;
c) ITU-T G.873.1—Optical Transport Network: Linear Protection;
d) ITU-T G.808.1—Generic Protection Switching—Linear trail and Subnetwork Protection;
e) ITU-T G.841—Types and Characteristics of SDH Network Protection Architectures;
f) IETF RFC6378—MPLS Transport Profile (MPLS-TP) Linear Protection; and
g) IEEE 802.1Q—Bridges and Bridged Networks.

In addition to the above-listed operator commands regarding protection techniques, the following commands are related to allowing a system to automatically revert back to a working or active path, or another section, connection, etc. For example, one command is a Revert Mode Selection command that allows an operator to select a mode regarding automatic reversion, where the operator can select a Revert ("Automatically Revert") or Do-Not-Revert ("Not-Automatic"). When Do-Not-Revert is selected, then reverting back to the working or active path requires the operator to manually revert back to this path. When not automatic ("Do-Not-Revert") is selected, another command, referred to as a Manual Revert command, can be provided by the operator to manually revert (switch) back to the working or active path.

Figure 2A:
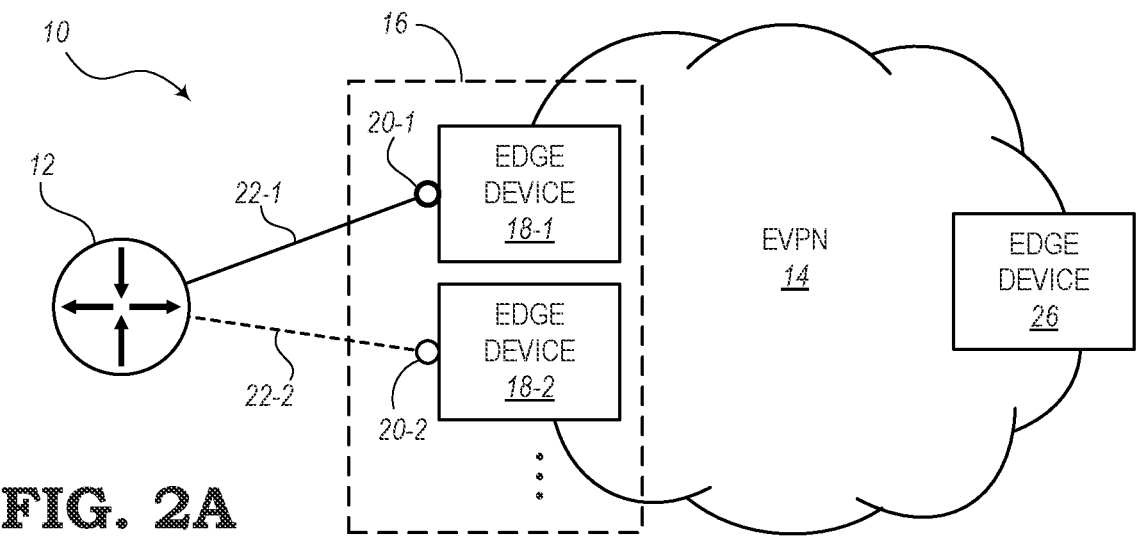
FIGS. 2A-2C are diagrams illustrating modes of the EVPN system shown in FIG. 1 in response to Force Switch and Clear commands, according to various embodiments.
Figure 2B:
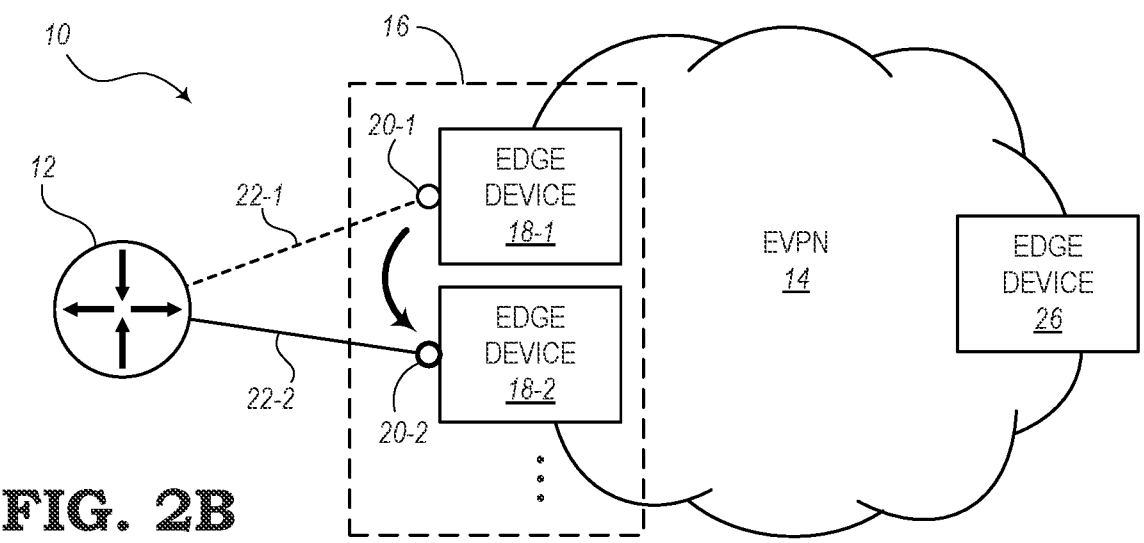
Figure 2C:
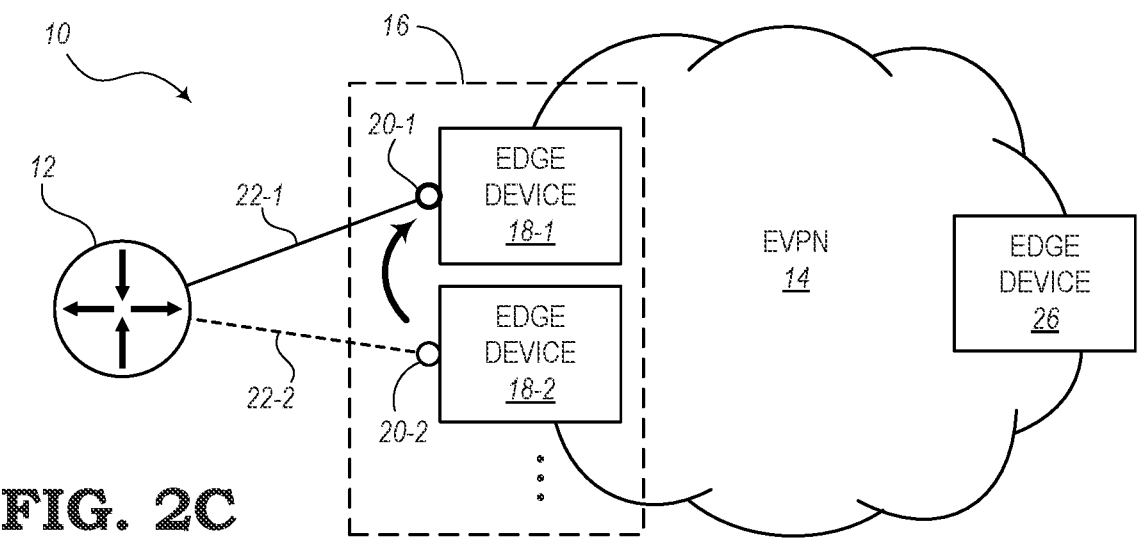
Figure 3A:
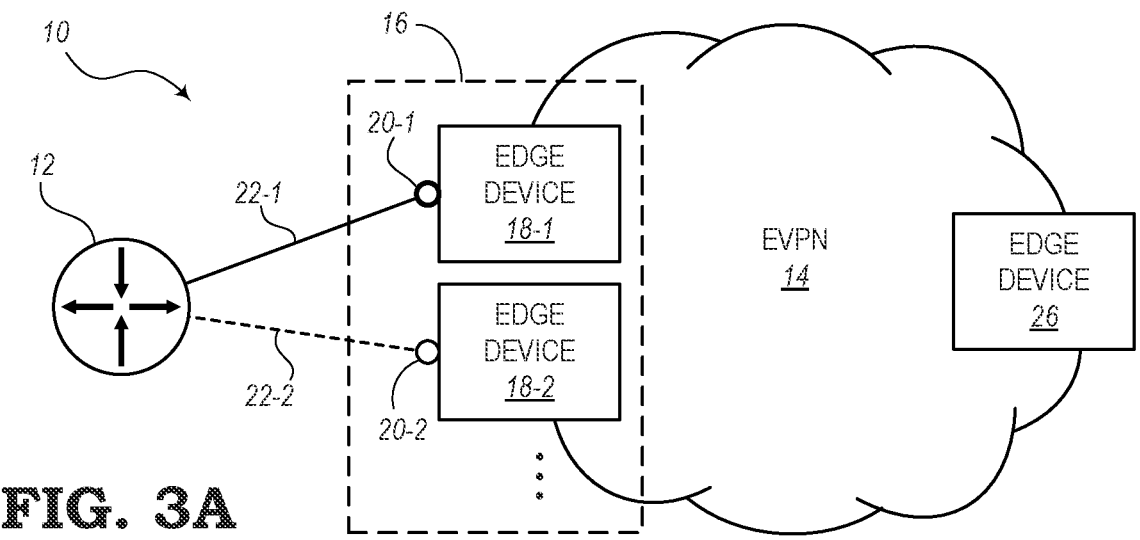
FIGS. 3A-3C are diagrams illustrating modes of the EVPN system shown in FIG. 1 in response to a Manual Switch command, according to various embodiments.
Figure 3B:
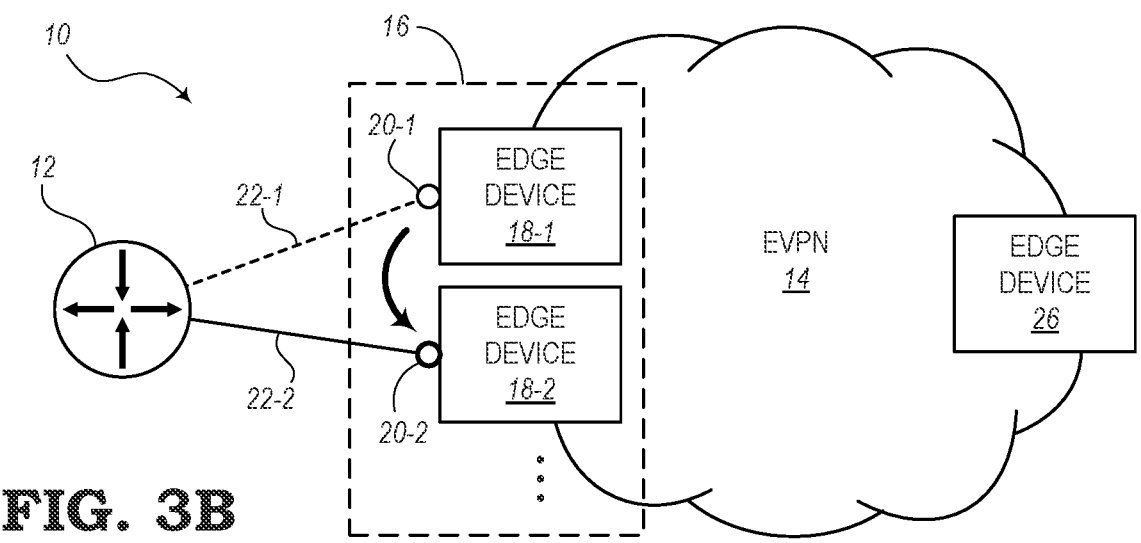
Figure 3C:
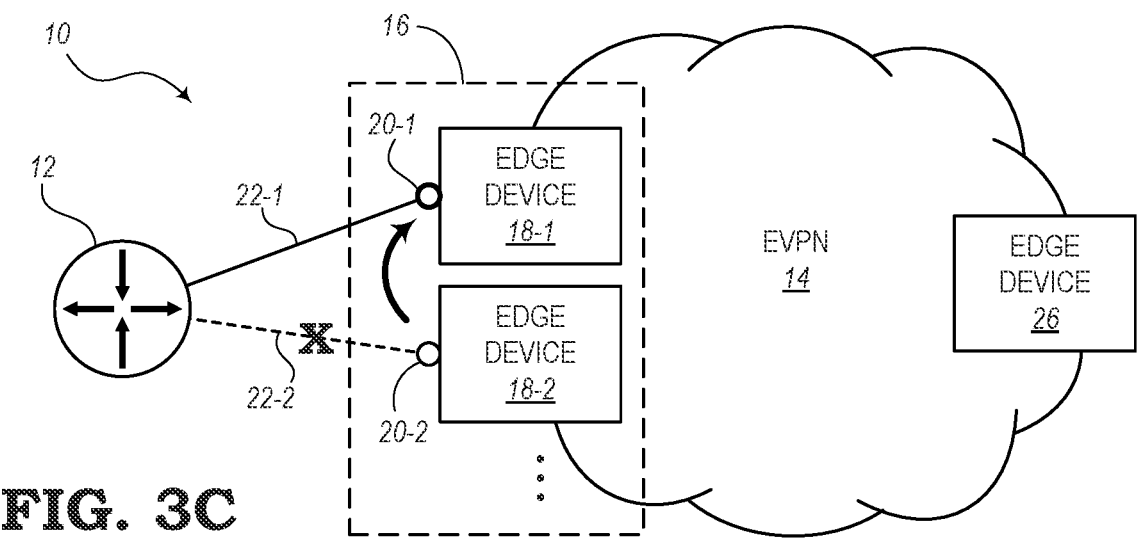
Figure 4A:
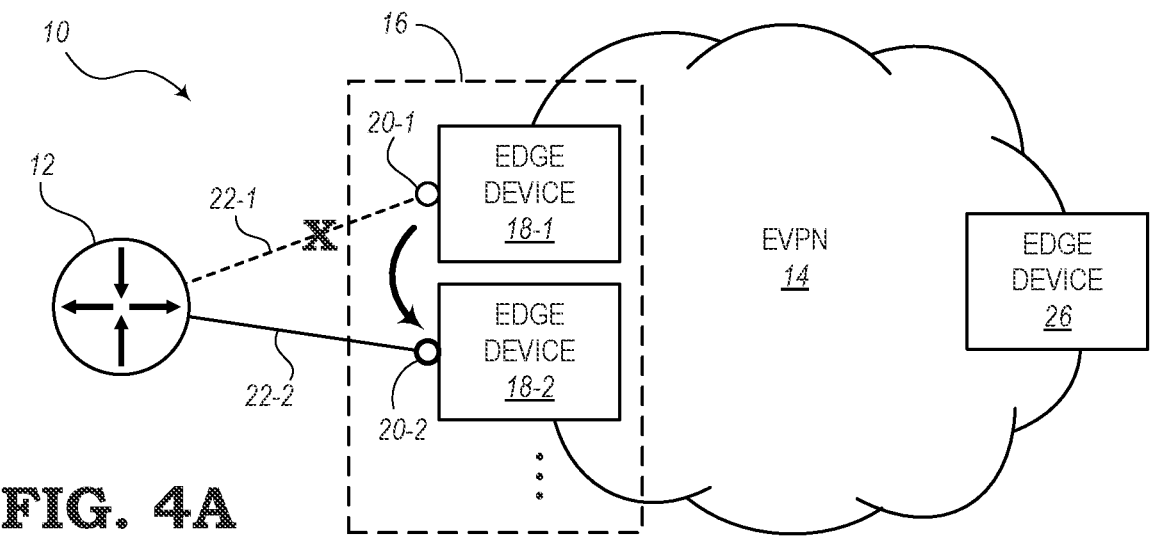
FIGS. 4A-4C are diagrams illustrating modes of the EVPN system shown in FIG. 1 in response to a Manual Revert command, according to various embodiments.
Figure 4B:
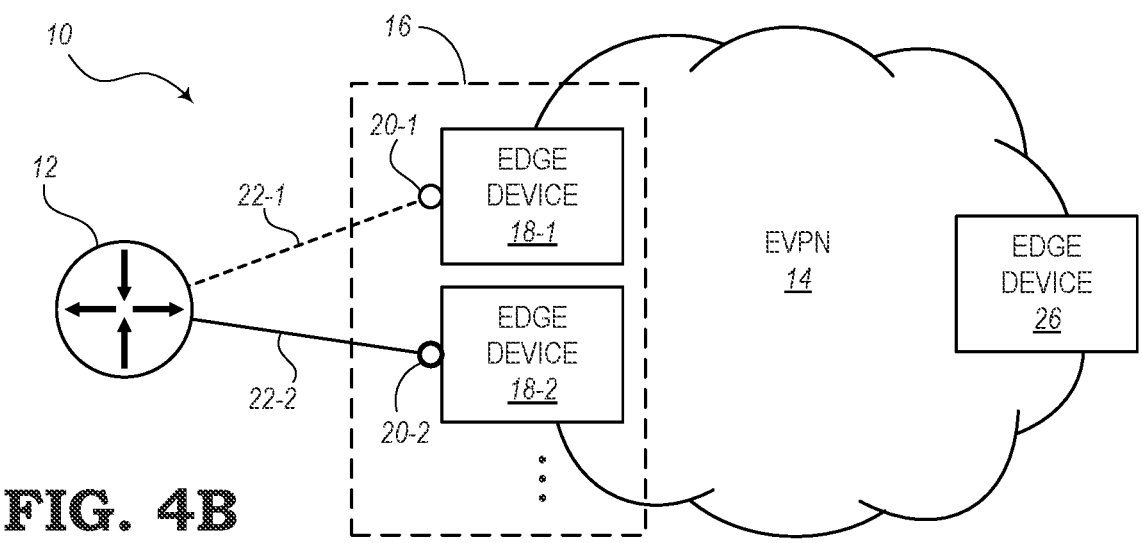
Figure 4C:
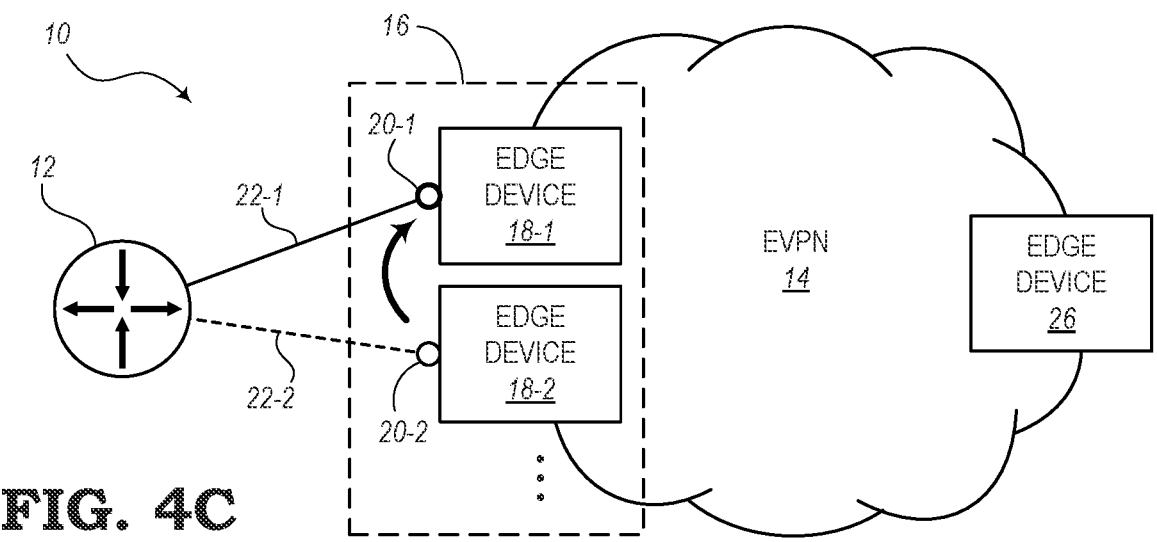

Operator commands and detected modes (e.g., states, conditions, etc.) may be ranked based on a specific priority, where the highest priority commands/modes are performed first before others are considered. One priority list (from highest priority to lowest priority) of commands/modes includes:
1) Lockout of Protection—operator command
2) Signal Fail (Protected)—detected mode
3) Force Switch—operator command
4) Signal Fail (Working)—detected mode
5) Signal Degrade—detected mode
6) Manual Switch—operator command
7) Wait to Restore—operator command
8) Exercise—operator command
9) Reverse Request—operator command
10) Do Not Revert—operator command
11) No Request (or Clear)—operator command or detected mode The following examples include the management of various operator commands with respect to protection techniques in an EVPN multi-homing system (e.g., EVPN system 10). FIGS. 2A-2C show an example of Force Switch and Clear operator commands. FIGS. 3A-3C show an example of a Manual Switch operator command. Also, FIGS. 4A-4C show an example of a Manual Revert operator command. Again, these examples are not possible with conventional systems. However, with the extension of EVPN protocols described in the present disclosure, the EVPN system 10 is configured to support these various protection commands to handle the specific operator commands related to protection switching techniques.

FIGS. 2A-2C are diagrams illustrating modes of the EVPN system 10 shown in FIG. 1 in response to Force Switch and Clear commands. In this example, a network operator (e.g., user of the operator device 12) may wish to perform a maintenance action (e.g., cleaning a fiber, replacing a fiber, etc.) associated with a link that is configured as an active link (e.g., working, primary link 22-1) where one or more redundant links (e.g., backup, standby, protection links 22-2 ... 22-n) may be part of a group (e.g., EVPN-LAG 16). The network operator may want to trigger a command to cause the active link 22-1 (for which the maintenance action is to be performed) to switch away from this link to one of the backup links within the EVPN-LAG 16.

In FIG. 2A, a fiber (or transceiver) of the active link 22-1 may need to be cleaned or replaced. The operator issues a Force Switch command. In FIG. 2B, the EVPN-LAG 16 is configured to cause an interface or port (e.g., port 20-1) associated with the active link 22-1 to be put out-of-service. Simultaneously, the EVPN-LAG 16 makes a backup link 22-2 and backup port 20-2 the new active link/port. Thus, this backup path can be used when the previously active link (e.g., link 22-1) is interrupted. As described with respect to FIG. 2C, the network operator finishes the maintenance procedures on the active path and may then issue a Clear operator command. In response to the Clear command, the EVPN-LAG 16 is configured to switch back to the original active port (e.g., port 20-1) to be the active path again.

FIGS. 3A-3C are diagrams illustrating modes of the EVPN system 10 in response to a Manual Switch command. In this second example of protection-related commands, a network operator may wish to perform a network maintenance action on a backup path (e.g., backup link 22-2), as shown in the mode of FIG. 3A. This backup path is part of a redundancy or protection group (e.g., EVPN-LAG 16) where one or more backup paths are available when routing is switched away from the primary path. From the original mode, the network operator may wish to invoke a command to cause the link to be tested (e.g., backup link 22-2). Thus, the network operator issues a Manual Switch command. In this case, for maintenance purposes, data traffic may be switched away from the active link (e.g., link 22-1) to the standby/backup link 22-2 within the EVPN-LAG 16, as shown in FIG. 3B. The EVPN-LAG 16 causes the active port (e.g., port 20-1) to be out-of-service and switches for the backup port (e.g., port 20-2) to become active. However, during the testing, the backup link 22-2 may detect a failure. If it is determined (e.g., using a signal detector) that there is a fault (e.g., Signal Failure (SF)) on the backup link 22-2, as shown in FIG. 3C, the EVPN-LAG 16 may be configured to switch back to the original active link 22-1, where port 20-1 becomes active again.

Since the Signal Failure (on the protection path) is the second highest priority command/mode in the above priority list, this detected condition may cause the automatic switch back to the active/primary link 22-1. However, in some embodiments, the EVPN-LAG 16 may be configured to switch back to the active link in response to receiving a Clear command.

FIGS. 4A-4C are diagrams illustrating modes of the EVPN system 10 in response to a Manual Revert operator command included in the EVPN protocol extension described in the present disclosure. In this third example, a network operator may wish to configure the EVPN-LAG 16 may be in a Do-Not-Revert mode (e.g., Non-Revertive mode, Not Automatic Revert mode, etc.). As shown in FIG. 4A, while in the Do-Not-Revert mode, a fault may be detected on the active (primary) link 22-1, which may cause the EVPN-LAG 16 to switchover to a backup path (e.g., backup link 22-2). FIG. 4B shows operation in the new backup mode. Also, the defective path may be corrected or restored (e.g., from some remediation actions). As a result, even when the previously active link is restored, a switchover does not automatically occur. However, at a designated time, as shown in FIG. 4C, the network operator may want to manually switch the traffic back to the previous active link. The operator issues the Manual Revert command and the EVPN-LAG 16 switches back to the original link 22-1 to make the corresponding port 20-1 active again.

It may be noted that the above examples are described with respect to two devices in the EVPN multi-homing redundancy group. However, it should also be noted that the same concepts can be applicable for the generalized case of N devices in the EVPN multi-homing redundancy group, where N≥2, and the multi-homing scheme is running in an all-active or single-active mode.

The presence of an operator command is signaled between the devices with the multi-homing redundancy group. This signaling can be instantiated via extensions to existing EVPN messaging (e.g., EVPN Ethernet Segment Route messages). In some embodiments, the EVPN extension may include a specific field in the EVPN Ethernet Segment Route message (or associated Extended Community fields). For example, this field can be defined to allow the EVPN-LAG 16 to carry the operational commands, particularly those commands related to protection switching operations, such as Lockout, Force Switch, Manual Switch, Manual Revert, Revert Mode Selection, Clear, etc. There may be numerous ways that the operator commands can be encoded in the messages or fields.

Figures 5, 6, 7:
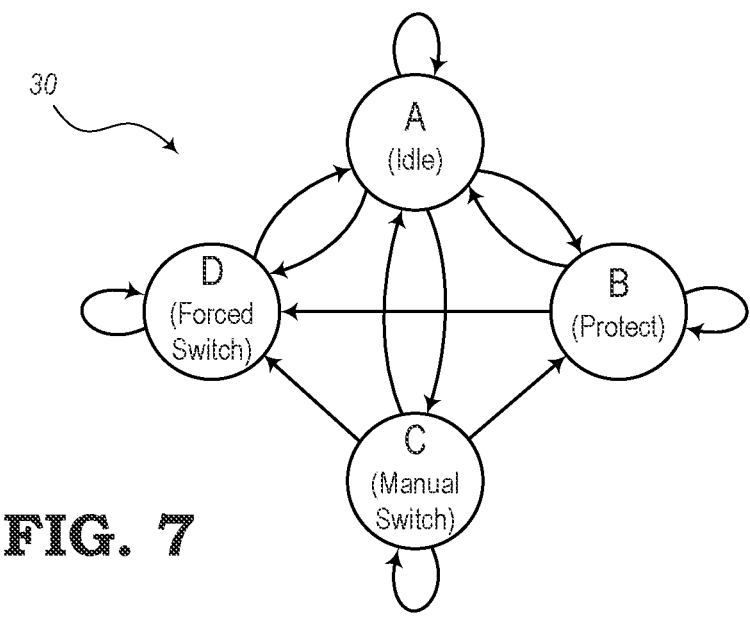
FIG. 5 is a table illustrating a field for carrying operator commands as part of an extension of the EVPN protocols, according to various embodiments.
FIG. 6 is a table illustrating a Designated Forwarder (DF) Election Extended Community sub-type for carrying operator commands, according to various embodiments.
FIG. 7 is a diagram illustrating a Finite-State Machine (FSM) associated with the EVPN system shown in FIG. 1, according to various embodiments.

FIG. 5 is a table illustrating an embodiment of an encoding field for carrying operator commands as part of an extension of the EVPN protocol. The EVPN Extended Community could be utilized with the Designated Forwarder (DF) Election Extended Community sub-type to carry this information. FIG. 6 is a table illustrating an embodiment of a DF Election Extended Community sub-type for carrying operator commands, according to various embodiments.

In an EVPN, a Designated Forwarder (DF) may be defined as a device (e.g., a Provider Edge (PE) device) responsible for sending Broadcast, Unknown unicast, and Multicast (BUM) traffic to a multi-homed device (e.g., a Customer Edge (CE) device). A preferred DF is selected from a number of PEs in the EVPN-LAG 16 for operation as an "active" connection (e.g., working connection, primary connection, etc.), while one or more DFs may be selected for operation as "backup" connections (e.g., protection connections, standby connections, etc.). DF switchover may be allowed at certain times (e.g., during maintenance, when a fault is detected, etc.) in order to switch from the active connection to one of the backup connections to allow data packets to continue to be transmitted in a system.

FIG. 7 is a diagram illustrating an embodiment of a Finite-State Machine (FSM) 30 associated with the EVPN system 10 of FIG. 1. The FSM 30 represents the states, modes, conditions, of the EVPN system 10 in response to various operator commands, such as those operator commands related to switching from a primary path to a secondary path for protection functionality in a multi-homing environment. The FSM 30 may be considered as a part of the EVPN protocol extension to support the protection operations as follows. In this embodiment, the EVPN system 10 may be in an "Idle" state, a "Protection" state, a "Manual Switch" state, and a "Forced Switch" state, and/or may be transitioning from one state to another.

When a "Force Switch" command is initiated, the EVPN-LAG 16 is configured to take the member connection (e.g., port 20-1, link 22-1) associated with an active (primary) Ethernet Segment Instance (ESI) out-of-service. This may be done by dispatching a Link Aggregation Control Protocol (LACP) message with an out-of-sync bit set to presently remove this connection from operation. However, if LACP is not used, the EVPN-LAG 16 may be configured to take down one or more logical ports. Also, in this case, the EVPN-LAG 16 is configured to dispatch an ES Route with EVPN Extended Community of sub-type 0x06 (e.g., DF Election Extended Community) with FS code 1101 to the peer.

When a "Manual Switch" command is initiated, the EVPN-LAG 16 is configured to take the member connection associated with the active ESI out-of-service. Again, this may be done by dispatching LACP with an out-of-sync bit set, when LACP is being used. Otherwise, if LACP is not used, the EVPN-LAG 16 may take down one or more logical ports. Then, the EVPN-LAG 16 is configured to dispatch an ES Route with EVPN Extended Community of sub-type 0x06 (DF Election Extended Community) with MS code 0111 to peer.

When a "Manual Revert" command is initiated, the EVPN-LAG 16 is configured to kick start a DF Election algorithm. When reset, the EVPN system 10 is configured to return back to its original configuration with the primary path in operation for carrying traffic.

When a "Clear" command is initiated, the EVPN-LAG 16 is configured to dispatch an ES Route with EVPN Extended Community of sub-type 0x06 (DF Election Extended Community) with NR code 0000 to peer. Also, the EVPN-LAG 16 is configured to kick start the DF Election algorithm to reset the system to its original primary path configuration.

If a local fault occurs on the primary connection (e.g., port 20-1, link 22-1), then the EVPN-LAG 16 is configured to dispatch an ES Route with EVPN Extended Community of sub-type 0x06 (DF Election Extended Community) with Signal Failure (SF) code 1011 to peer. It may be noted that when there is no fault (normal scenario), a No Request code 0000 may be sent. In some cases, however, the No Request may also represent a "Clear" command.

When the EVPN-LAG 16 receives the ES Route with EVPN Extended Community and Force Switch Code of 1101 from the operator device 12, The EVPN-LAG 16 is configured to attempt to put the active member associated with ESI (e.g., port 20-1, link 22-1) by dispatching LACP with the out-of-sync bit reset or bring up one or more logical ports. Once in this state, the only event that takes the FSM 30 out is the reception of an ES Route with Clear code 0000. For example, even a local SF on the primary connection does not move the FSM 30 out of this state. In some embodiments, however, there may be one or more other events that can drive the FSM 30 into another state (e.g., an Initial state) to recover the system.

When the EVPN-LAG 16 receives the ES Route with EVPN Extended Community and Manual Switch code of 0111, the EVPN-LAG 16 is configured to attempt to put the active member associated with ESI (e.g., port 20-1, link 22-1) by dispatching LACP with an out-of-sync bit reset or bring up logical port(s). If a local SF occurs, the EVPN-LAG 16 is configured to dispatch LACP with an out-of-sync bit set out for the failed interface and dispatch an ES Route with SF Code value 1011 to a peer.

When the EVPN-LAG 16 receives the ES Route with EVPN Extended Community and SF Code of 1011, the EVPN-LAG 16 may be configured to attempt to put the active member associated with ESI (e.g., port 20-1, link 22-1) by dispatching LACP with an out-of-sync bit reset or bring up logical port(s).

Thus, the FSM 30 is configured to support the EVPN protocol extensions described in the present disclosure to enable operator commands to be handled in a multi-homing environment. Requests (or commands) labelled "Clear," "Force Switch," "Manual Switch," and "Manual Revert" in the tables of FIGS. 8-11 described below represent "operator commands" that may be invoked by a network operator, administrator, or other management professional who may enter the commands via the operator device 12. The other "requests" or actions shown in the tables of FIGS. 8-11 represent either EVPN control protocol messages that result from the operator commands (e.g., Ethernet Segment (ES) Route messages, ES Route switched events, etc.) or other system events (e.g., Signal Failure (SF) events).

FIGS. 8-11 are tables illustrating various embodiments of different actions and states associated with the Idle state, Protection state, Manual Switch state, and Forced Switch state of the FSM 30 of FIG. 7. The tables of FIGS. 8-11 include "input" and "output" sections. The input section includes a node state of the respective table, a top priority request column, and a row column. The output section includes an "actions" column that defines the output actions and a "next node state" column that defines the next state (e.g., corresponding to A—Idle state, B—Protection state, C—Manual Switch state, and D—Forced Switch state).

As an example, the interpretation of the FSM 30 and corresponding tables may not be completely intuitive in some scenarios. For example, suppose the network operator initiates a Force Switch command on an interface associated with one of the devices within the EVPN multi-homing group (e.g., EVPN-LAG 16). If the device within the EVPN-LAG 16 is in a normal Idle state A and row 2 (FIG. 8) is met, then the EVPN-LAG 16 is configured to perform actions of (a) Tx LACP signal (with out-of-sync bit set) on member interface, (b) Tx an EVPN Ethernet Segment (ES) Route message with a code of FS to peer(s), (c) withdraw the ES Route by executing the EVPN Designated Forwarder algorithm configured on the device, and (d) running the DF election, and then moving to state D "Force Switch" thereafter. When the other devices within the EVPN-LAG 16 (e.g., multi-homing group associated with the Ethernet Segment Instance (ESI)) receive the EVPN Ethernet Segment Route message with code of FS, they will normally be in the A—Idle state. Then, row 3 (FIG. 8) may be met and executed.

Therefore, the systems and methods of the present disclosure include an extension to the EVPN specifications and protocols. In one implementation, a system (e.g., a Link Aggregation Group (LAG), an EVPN-LAG, a group of PE devices or other edge devices, etc.) may include a plurality of Ethernet Segments (ESs) and a plurality of service ports configured to communicate over the plurality of ESs. The plurality of service ports may be configured to enable an operator (e.g., utilizing an operator device, Customer Edge (CE) device, etc.) to access an EVPN to receive Layer 2 (L2) and Layer 3 (L3) Ethernet services. The service ports may be configured to enable the operator device to operate with multi-homing functionality to receive the L2 and L3 Ethernet services via redundant paths (e.g., active and/or backup paths) associated with the plurality of ESs. The services ports may also be configured to respond to operator commands. In particular, the operator commands include one or more operator commands related to switching among the redundant paths. Of note, the operator commands are entered (by an operator) on one of the edge devices 18.

The one or more operator commands may be part of an extension of EVPN protocols. The extension of the EVPN protocols may enable signaling between the operator device and the service ports to carry ES route messages that include the operator commands. The EVPN extension may also include an Extended Community field configured to carry the operator commands. The Extended Community field, for example, may include a Designated Forwarder (DF) election sub-type for electing an active ES and one or more backup ESs as redundant paths responsive to the one or more operator commands.

The system may further be defined where the service ports can be associated with one or more Provider Edge (PE) devices of a Link Aggregation Group (LAG), where the operator device is a Customer Edge (CE) device, and where the ESs include a set of Ethernet links connecting the CE device to the one or more PE devices. The LAG enables single-active or all-active forwarding with respect to the one or more PE devices, load balancing among the one or more PE devices, and Media Access Control (MAC) and Internet Protocol (IP) traffic learning by the one or more PE devices.

The one or more operator commands described above may include a Lockout command, a Force Switch command, a Manual Switch command, a Revert Mode Selection command, and a Manual Revert command. There may be a priority list of the operator commands and detected operating modes including, from highest priority to lowest priority, the Lockout command, a Signal Failure (SF) mode of a backup ES path, the Force Switch command, a SF mode of an active ES path, a Signal Degrade mode of the active ES path, the Manual Switch command, a Wait to Restore command, an Exercise command, the Manual Revert command, the Mode Selection command, and a Clear command. The ESs and service ports may be associated with a finite-state machine having an Idle state, a Protection state, a Manual Switch state, and a Forced Switch state. Also, the ESs and service ports may be configured to change states and perform actions based on the operator commands.

With the systems and methods described in the present disclosure, certain novel features may be noted with respect to conventional systems that are unable to handle operator commands related to protection switching functions in an EVPN multi-homing infrastructure. For example, one point of novelty is that the present disclosure is able to support Force Switched operator commands for EVPN multi-homed applications, support Manual Switched operator commands for EVPN multi-homed applications, support Clear operator commands for EVPN multi-homed applications, support Manual Revert operator commands for EVPN multi-homed application, and support well-established operator command priority requests for EVPN multi-homed applications. In addition, the EVPN protocol extensions may be configured to support other operator commands.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A system comprising:
   a plurality of Ethernet Segments (ESs); and
   a plurality of service ports configured to communicate over the plurality of ESs, the plurality of service ports configured to enable an operator device to access an Ethernet Virtual Private Network (EVPN) to receive Layer 2 (L2) and Layer 3 (L3) services;
   wherein the service ports are configured to enable the operator device to operate with multi-homing functionality to receive the L2 and L3 services via redundant paths associated with the plurality of ESs; and
   wherein the services ports are configured to respond to operator commands included in EVPN messages, as a code in one of an EVPN ES Route message, an Extended Community Field, and a Designated Forwarder (DF) election sub-type, the operator commands including one or more operator commands related to switching among the redundant paths, and wherein the one or more operator commands include any of a Lockout command, a Force Switch command, a Manual Switch command, a Revert Mode Selection command, and a Manual Revert command.

2. The system of claim 1, wherein the one or more operator commands are part of an extension of EVPN protocols.

3. The system of claim 2, wherein the extension of the EVPN protocols enables signaling between the operator device and the service ports to carry the ES route messages that include the operator commands.

4. The system of claim 2, wherein the extension of the EVPN protocols includes the Extended Community field configured to carry the operator commands.

5. The system of claim 4, wherein the Extended Community field includes the Designated Forwarder (DF) election sub-type for electing an active ES and one or more backup ESs as redundant paths responsive to the one or more operator commands.

6. The system of claim 1, wherein the service ports are associated with one or more Provider Edge (PE) devices of a Link Aggregation Group (LAG), wherein the operator device is a Customer Edge (CE) device, and wherein the ESs include a set of Ethernet links connecting the CE device to the one or more PE devices.

7. The system of claim 6, wherein the LAG enables single-active or all-active forwarding with respect to the one or more PE devices, load balancing among the one or more PE devices, and Media Access Control (MAC) and Internet Protocol (IP) traffic learning by the one or more PE devices.

8. The system of claim 1, wherein a priority, from highest to lowest, of operator commands and detected operating modes includes the Lockout command, a Signal Failure (SF) mode of a backup ES path, the Force Switch command, a SF mode of an active ES path, a Signal Degrade mode of the active ES path, the Manual Switch command, a Wait to Restore command, an Exercise command, the Manual Revert command, the Mode Selection command, and a Clear command.

9. The system of claim 1, wherein the ESs and service ports are associated with a finite-state machine having an Idle state, a Protection state, a Manual Switch state, and a Forced Switch state, and wherein the ESs and service ports are configured to change states and perform actions based on the operator commands.

10. A device comprising a Link Aggregation Group (LAG) comprising:
a plurality of Ethernet Segments (ESs); and
a plurality of service ports configured to communicate over the plurality of ESs, the plurality of service ports configured to enable an operator device to access an Ethernet Virtual Private Network (EVPN) to receive Layer 2 (L2) and Layer 3 (L3) services;
wherein the service ports are configured to enable the operator device to operate with multi-homing functionality to receive the L2 and L3 services via redundant paths associated with the plurality of ESs; and
wherein the services ports are configured to respond to operator commands included in EVPN messages, as a code in one of an EVPN ES Route message, an Extended Community Field, and a Designated Forwarder (DF) election sub-types, the operator commands including one or more operator commands related to switching among the redundant paths, and wherein the one or more operator commands include any of a Lockout command, a Force Switch command, a Manual Switch command, a Revert Mode Selection command, and a Manual Revert command.

11. The device of claim 10, wherein the one or more operator commands are part of an extension of EVPN protocols, and wherein the extension of the EVPN protocols enables signaling between the operator device and the service ports to carry the ES route messages that include the operator commands.

12. The device of claim 11, wherein the extension of the EVPN protocols includes the Extended Community field configured to carry the operator commands, and wherein the Extended Community field includes the Designated Forwarder (DF) election sub-type for electing an active ES and one or more backup ESs as redundant paths responsive to the one or more operator commands.

13. The device of claim 10, wherein the service ports are associated with one or more Provider Edge (PE) devices, wherein the operator device is a Customer Edge (CE) device, and wherein the ESs include a set of Ethernet links connecting the CE device to the one or more PE devices.

14. The device of claim 13, wherein the one or more PE devices are configured for single-active or all-active forwarding, load balancing, and Media Access Control (MAC) and Internet Protocol (IP) traffic learning.

15. The device of claim 10, wherein a priority, from highest to lowest, of operator commands and detected operating modes includes the Lockout command, a Signal Failure (SF) mode of a backup ES path, the Force Switch command, a SF mode of an active ES path, a Signal Degrade mode of the active ES path, the Manual Switch command, a Wait to Restore command, an Exercise command, the Manual Revert command, the Mode Selection command, and a Clear command.

16. The device of claim 10, wherein the ESs and service ports are associated with a finite-state machine having an Idle state, a Protection state, a Manual Switch state, and a Forced Switch state, and wherein the ESs and service ports are configured to change states and perform actions based on the operator commands.

17. A non-transitory computer-readable medium configured to store computer logic having instruction that, when executed, cause a processing device to:
enable a plurality of service ports to communicate over a plurality of Ethernet Segments (ESs);
configure the plurality of service ports to enable an operator device to access an Ethernet Virtual Private Network (EVPN) to receive Layer 2 (L2) and Layer 3 (L3) services;
configure the plurality of service ports to enable the operator device to operate with multi-homing functionality to receive the L2 and L3 services via redundant paths associated with the plurality of ESs; and
configure the plurality of services ports to respond to operator commands included in EVPN messages, as a code in one of an EVPN ES Route message, an Extended Community Field, and a Designated Forwarder (DF) electron sub-type, the operator commands including one or more operator commands related to switching among the redundant paths, and wherein the one or more operator commands include any of a Lockout command, a Force Switch command, a Manual Switch command, a Revert Mode Selection command, and a Manual Revert command.

18. The non-transitory computer-readable medium of claim 17, wherein the one or more operator commands are part of an extension of EVPN protocols, wherein the extension of the EVPN protocols enables signaling between the operator device and the service ports to carry ES route messages that include the operator commands, wherein the extension of the EVPN protocols includes an Extended Community field configured to carry the operator commands, and wherein the Extended Community field includes the Designated Forwarder (DF) election sub-type for electing an active ES and one or more backup ESs as redundant paths responsive to the one or more operator commands.

* * * * *